INVENTOR.
ALEXANDER J. RAITCH
BY Schmieding and Fultz
ATTORNEYS

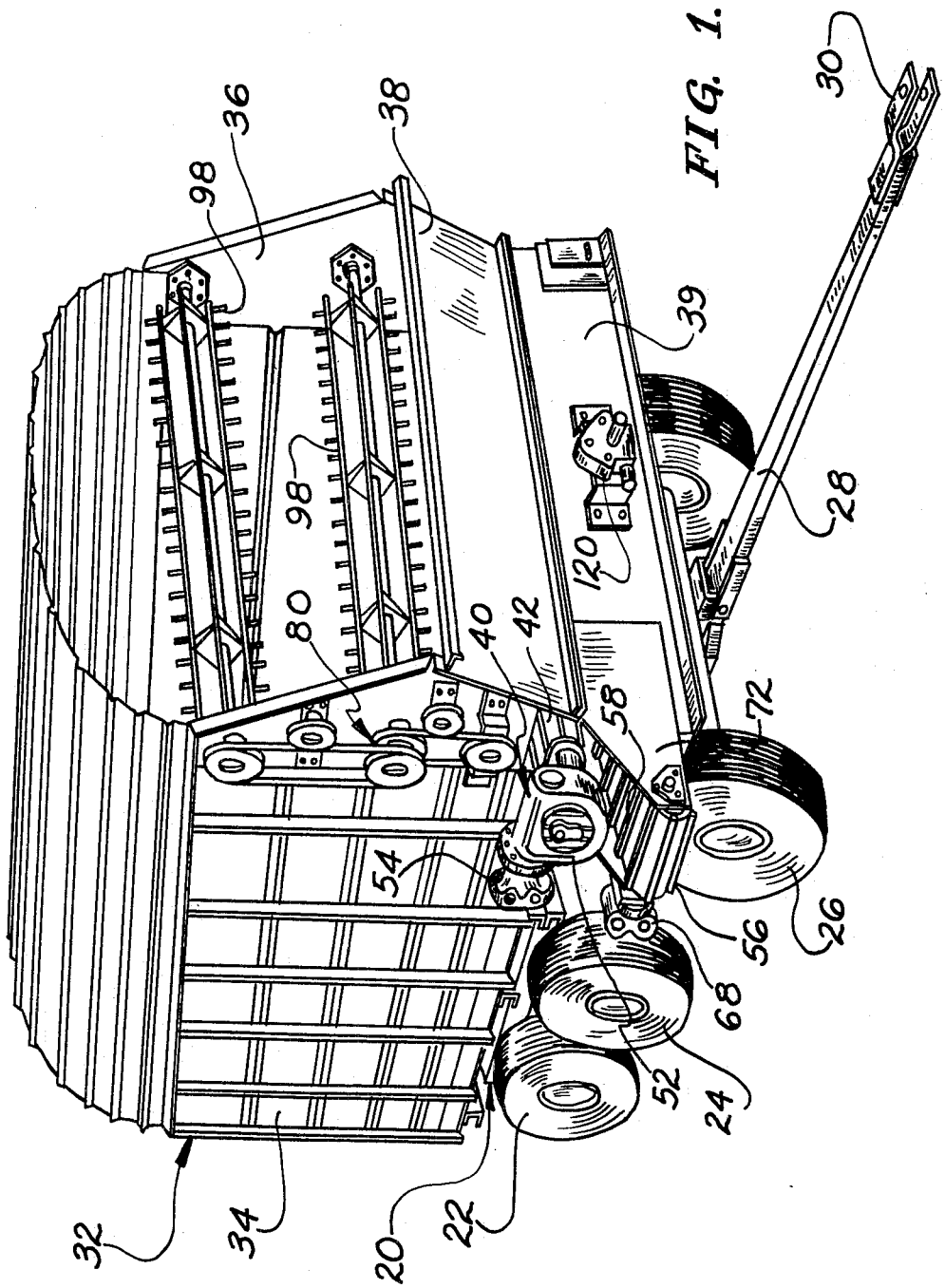

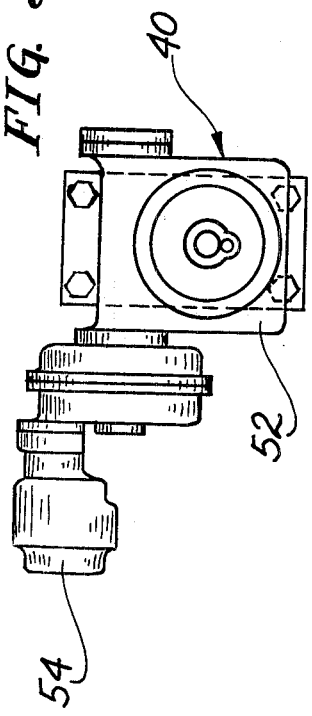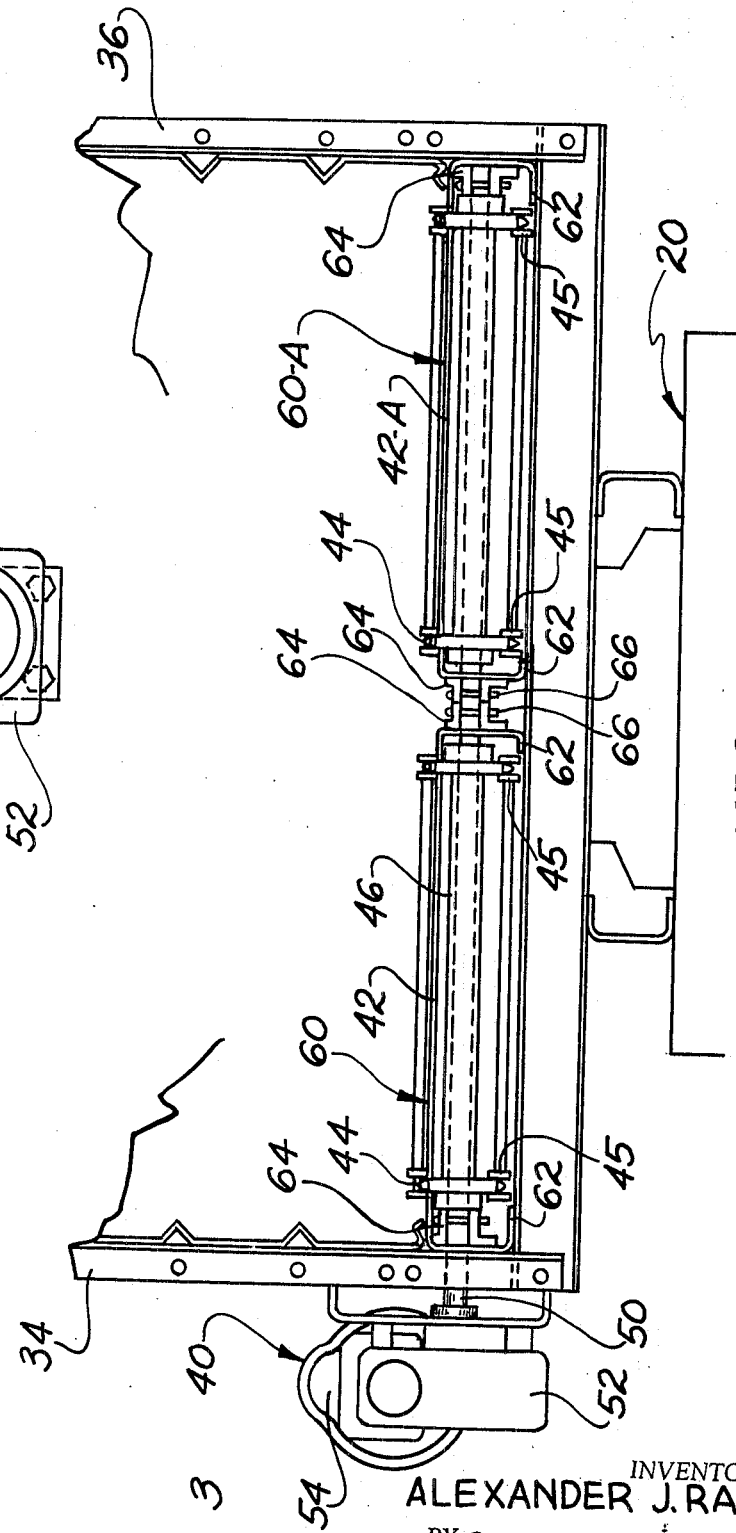

May 19, 1970 A. J. RAITCH 3,512,668
CONVEYOR CONSTRUCTION FOR CROP AND FORAGE VEHICLE
Filed Jan. 2, 1968 4 Sheets-Sheet 4

INVENTOR.
ALEXANDER J. RAITCH
BY Schmielding and Fultz
ATTORNEYS

United States Patent Office 3,512,668
Patented May 19, 1970

3,512,668
CONVEYOR CONSTRUCTION FOR CROP AND FORAGE VEHICLE
Alexander J. Raitch, Mansfield, Ohio, assignor to Harsco Corporation, Harrisburg, Pa., a corporation of Delaware
Filed Jan. 2, 1968, Ser. No. 695,249
Int. Cl. B60p 1/38
U.S. Cl. 214—519    9 Claims

ABSTRACT OF THE DISCLOSURE

A wagon for transporting and unloading crop, forage and the like of the type that includes a floor conveyor adapted to move the load longitudinally of the vehicle to a cross conveyor, the latter serving to progressively discharge the load from the wagon.

---

Figure 4:
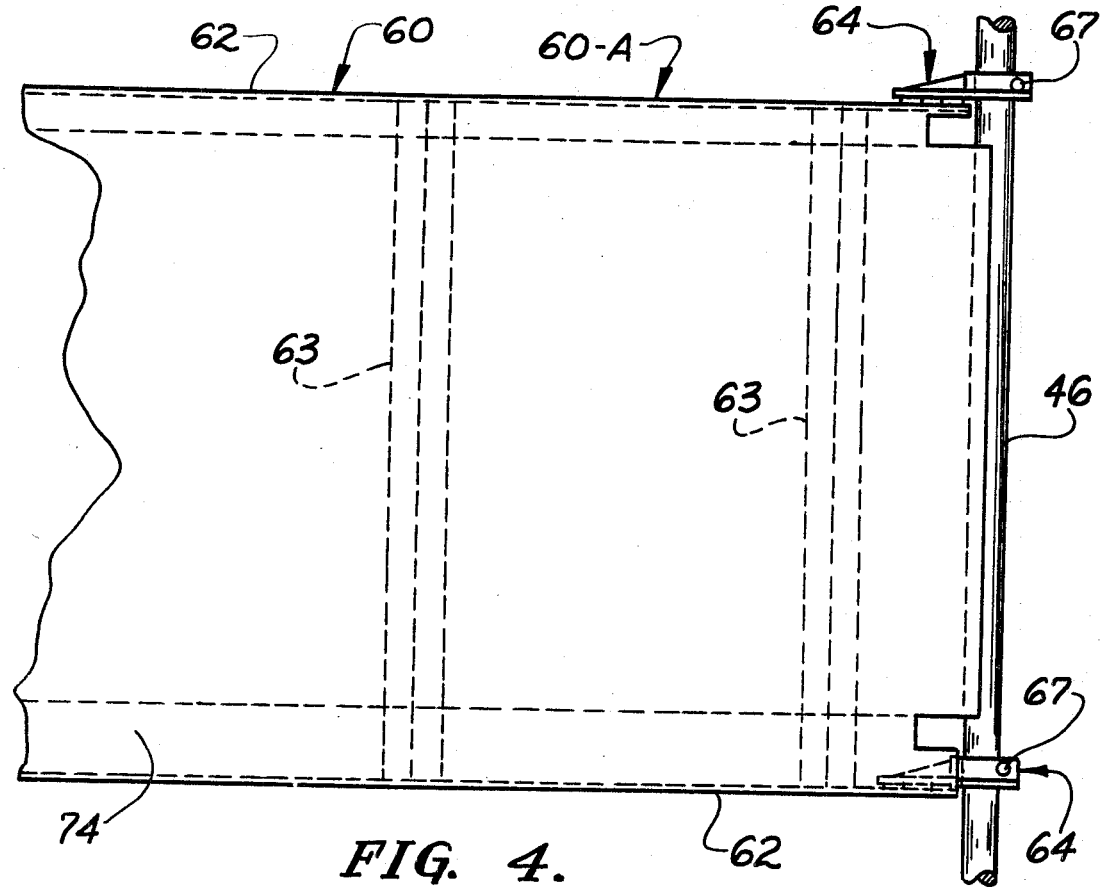

In accordance with the present invention the floor conveyor is of a novel construction whereby an endless belt component and the drive shaft assembly therefor can quickly be disassembled from the frame means while in the field by relatively inexperienced operators. As another aspect of the present invention the above mentioned floor conveyor and all its operating components are unitized and adapted for removal from the wagon as a subassembly.

This invention relates to farm vehicles of the type used for transporting and unloading crop, forage and the like.

In general, the crop and forage vehicle of the present invention comprises a wagon type apparatus which includes a draw bar for attachment to a tractor or other towing vehicle.

The vehicle includes a wheel frame that supports a body which includes side walls, end walls and a floor. The latter supports a floor conveyor for moving crop or forage material longitudinally in the body to a cross conveyor and overlying beaters adjacent an end wall of the vehicle.

The beaters serve to decompact and mix the crop or forage material, and the cross conveyor serves to discharge the material from the body, either to the ground, or to an elevating conveyor external of the body.

As one aspect of the present invention the above mentioned floor conveyor is provided with a novel conveyor shaft mounting means whereby a component endless conveyor belt can be readily detached and removed from the conveyor frame means without removing the frame means from the wagon, thereby permitting quick easy servicing in the field.

As another aspect of the present invention the floor conveyor frames assembly is so constructed that brackets forming open ended slots can be mounted on the ends of longitudinally conveyor frame members, and detachable closure means are provided for the slots whereby the shafts that mount the endless conveyor can be readily disassembled from the conveyor frame means in the field.

As still another aspect of the present invention the above mentioned floor conveyor is constructed as a novel assembly of longitudinally side and sheet-type top members that support all the operating components in a utilized manner such that the floor conveyor is adapted for installation or removal from the wagon as a sub-assembly.

It is, therefore, an object of the present invention to provide a crop and forage vehicle that includes a novel floor conveyor system particularly adapted for vehicle use which can be readily disassembled for servicing in the field.

It is another object of the present invention to provide a crop and forage vehicle that includes a floor conveyor apparatus constructed as a sub-assembly of longitudinal side and sheet-type top members that cooperate with the operating components to provide a conveyor system uniquely adapted for unitized removal from the wagon as a sub-assembly.

Further objects and advantages of the present invention will be apparent from the following description, reference being had to the accompanying drawings wherein a preferred form of embodiment of the invention is clearly shown.

Figure 5:
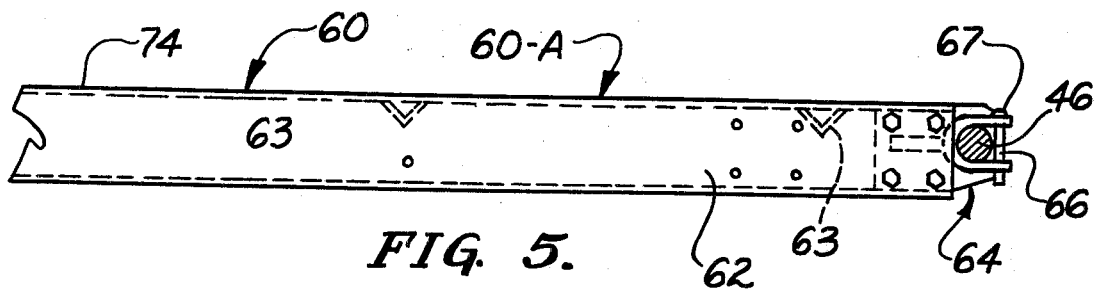
Figure 6:
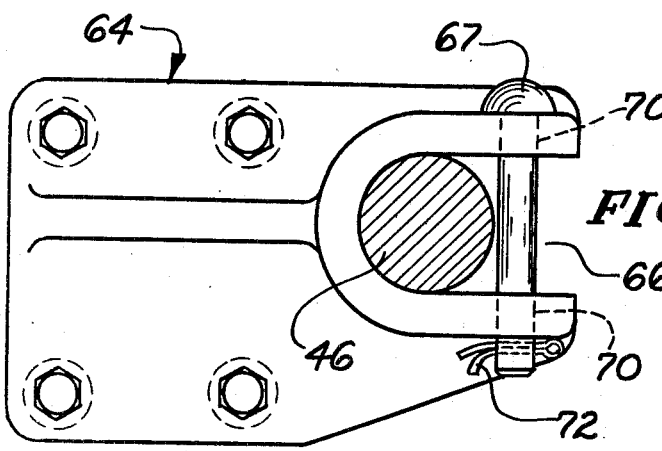
Figure 7:
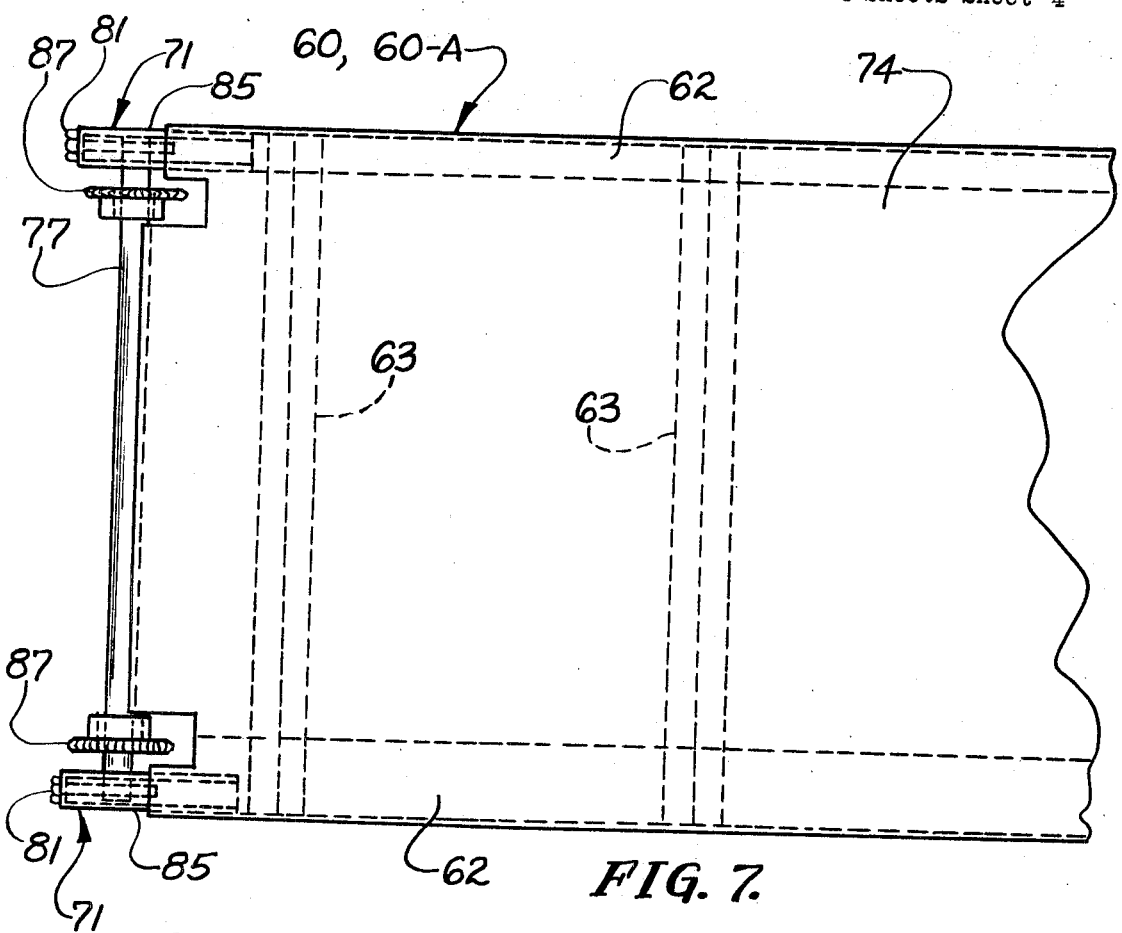
Figure 8:
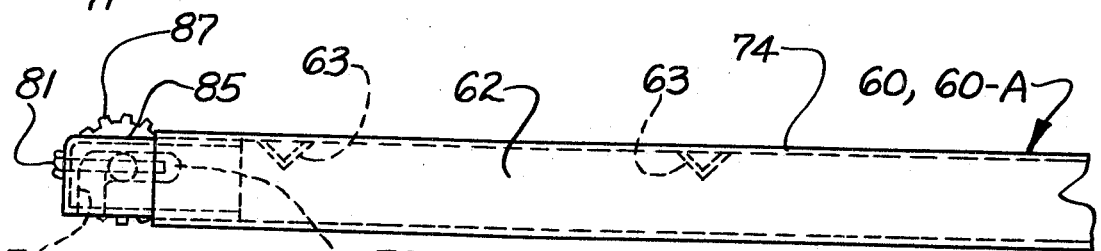
Figure 9:
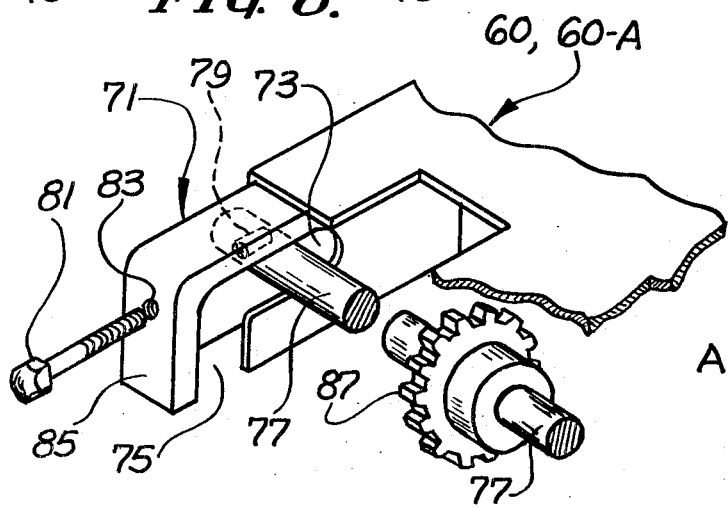

In the drawings:
FIG. 1 is a perspective view of a crop and forage vehicle constructed in accordance with the present invention;
FIG. 2 is an end elevational view, partially in section, of a floor conveyor and drive assembly comprising a portion of the vehicle of FIG. 1;
FIG. 3 is a side elevational view of the floor conveyor and drive assembly of FIG. 2;
FIG. 4 is a partial top elevational view of a floor conveyor frame and shaft mount comprising a portion of the apparatus of FIG. 2;
FIG. 5 is a partial side elevational view of the floor conveyor frame and shaft mount of FIG. 4;
FIG. 6 is a side elevational view of a shaft mounting bracket comprising a portion of the apparatus of FIGS. 4 and 5;
FIG. 7 is a partial top elevational view of the rear portion of the floor conveyor frame and idler shaft mount comprising a portion of the apparatus of FIG. 2;
FIG. 8 is a partial side elevational view of the rear portion of the floor conveyor frame and idler shaft mount comprising a portion of the apparatus of FIG. 2; and
FIG. 9 is a partial perspective view of the idler shaft mount of FIGS. 7 and 8.

Referring in detail to the drawings, FIG. 1 illustrates a crop and forage wagon constructed in accordance with the present invention which includes a main frame indicated generally at 20, rear wheels 22, center wheels 24 and front wheels 26.

Front wheels 26 are steerable by means of a draw bar 28 adapted to be attached to a farm tractor or other towing vehicle at a hitch 30.

With continued reference to FIG. 1, the vehicle further includes a body indicated generally at 32 that comprises right and left side walls 34 and 36, a front wall 38 and a conventional rear wall which may be in the form of a conventional tailgate, not illustrated.

Referring particularly to FIGS. 1 through 3, the vehicle is provided with a floor conveyor and drive assembly indicated generally at 40 that includes two floor conveyor belts 42 and 42–A that are respectively mounted on conveyor frame assemblies indicated generally at 60 and 60–A. These belts and conveyor frame assemblies are disposed in side by side relationship as is best seen in FIG. 2.

It should be pointed out that each of the conveyor frame assemblies 60 and 60–A is removably supported on the floor or bottom frame members of the wagon body so that each of the frame assemblies 60 and 60–A, including all operating components mounted thereon can quickly and easily be removed from the main frame 20 of the vehicle as a unitized sub-assembly shown in isolated relationship in FIGS. 4, 5, 7, and 8. Such removability offers great advantages and economy in manufacturing and when major servicing is required.

For purposes of detailed description, one of the conveyor frame assemblies is illustrated in enlarged detail in FIGS. 4–9 and includes longitudinal frame members 62 and a sheet metal top wall 74 provided with integrally formed stiffener flanges 63.

As seen in FIGS. 2–6, which illustrate the front portions of the conveyor frame assemblies, a driven shaft 46 is detachably journaled in bearing brackets 64, one of said brackets being shown in enlarged detail in FIG. 6.

As seen in FIG. 6, brackets 64 comprise open ended generally U-shaped slots 66 that include detachable closures shown in the form of pins 67 that extend through holes 70, said pins being retained in place by cotter keys 72.

With continued reference to FIGS. 1 and 2, conveyor belts 42 and 42–A include link chain portions 45 that are mounted on driven sprockets 44 keyed to drive shaft 46 and an end of drive shaft 46 is detachably keyed to a speed reduction gear box 52 by a coupling 50 which comprise a portion of the driving means for shaft 46. Gear box 52 is in turn driven by a fluid motor 54, connected to a pump 120, FIG. 1, which in turn can be driven by the power take-off shaft of the towing vehicle, or by other suitable power means.

Reference is next made to FIGS. 7–9 which illustrate the rear portion of one of the conveyor frame assemblies 60, 60–A. Here it will be seen that each frame assembly includes spaced idler shaft mounts indicated generally at 71.

Each idler shaft mount is bolted to the rear end of a respective longitudinal frame member and includes a slot 73 having an open end 75.

An idler shaft 77, FIG. 9, is mounted for longitudinal movement in slots 73 of the idler shaft mounts and said shaft includes threaded holes 79 for receiving the threaded ends of conveyor belt adjusting bolts 81.

As seen in FIG. 9, the belt adjusting bolts 81 are extended through holes 83 in the end faces 85 of idler shaft mounts 71 such that the heads of bolts 81 engage the faces 85. Hence it will be understood that each idler shaft 77 can be adjusted longitudinally in its respective slots 73 to adjust the tightness of conveyor belts 42 and 42–A.

With continued reference to FIGS. 7–9, each idler shaft 77 carries a pair of idler sprockets 87 each of which includes a bearing surface that permits the sprockets to rotate freely with respect to idler shaft 77. These sprockets in turn engage the roller chain portions 45 of the conveyor belts 42 and 42–A.

Referring again to FIG. 1, the vehicle further includes a cross conveyor assembly 56 driven by a second fluid motor 68, and provided with an endless conveyor belt 58 that serves to unload the material delivered to the end of the vehicle by the floor conveyor assembly previously described.

As seen in FIG. 1, a plurality of beaters 98 are journaled between the side walls of the vehicle and powered by means of a beater drive assembly indicated generally at 80.

In operation, the endless floor conveyor 42 serves to deliver crop, forage, or the like to the beaters 98 which mix and decompact the material after which the material is discharged to the ground, or to an elevator leading from the cross conveyor to a storage building.

In the event it should become necessary to disassemble either of the conveyor frame assemblies 60 or 60–A this can easily be done in the field by relatively inexperienced operators and with a minimum of tools.

A link is first removed from each of the chain link portions 45, FIG. 2, in the conventional manner, which permits removal of the conveyor belts 42 and 42–A through the rear of the body.

The cotter pins 72, FIG. 6, are next removed from the lower ends of bearing pins 67 which are next removed from the holes 70 in bearing brackets 64.

Driven shaft 46 can next be lifted out of its mounted position in slots 66 as shown in FIGS. 4–6.

Referring next to FIGS. 7–9, in the event it becomes necessary to remove the idler shafts 77 or idler sprockets 87 this is easily accomplished by removing tension bolts 81 from threaded holes 79 in the shafts and unthreaded holes 83 in the idler shaft mounts whereby the idler shafts can be removed from the open ends 75 of the slots 73.

I claim:

1. A vehicle for transporting and unloading crop, forage and the like comprising, in combination, main frame means including supporting wheels; body means including side walls and end walls; conveyor frame means including spaced frame members extending longitudinally of said vehicle within said walls; a first bracket mounted on an end of one of said frame members and including a generally U-shaped slot; a second bracket mounted on an end of another of said frame member and including a generally U-shaped slot laterally aligned with said first mentioned U-shaped slot; shaft means removably mounted in said U-shaped slots; removable closures for said U-shaped slots; a main endless conveyor mounted on said shaft means and defining a floor for said vehicle and including a discharge end spaced inwardly from one of said end walls; cross conveyor means mounted on said frame means adjacent said one end wall and below said discharge end, said body means including a discharge opening for said cross conveyor means; and driving means detachably connected to said shaft means.

2. The apparatus defined in claim 1 wherein said conveyor frame means includes a bearing means provided with a removable shoulder whereby said shaft means can be removed from said frame means.

3. The apparatus defined in claim 1 wherein said conveyor frame means comprises an idler shaft means and idler shaft mounting means includes a slot for axially shiftably mounting said idler shaft means.

4. The apparatus defined in claim 3 wherein said idler shaft mounting means includes an open ended slot for removably shiftably mounting said idler shaft means.

5. The apparatus defined in claim 1 that includes two separate conveyor frame means said idler shaft means includes two separate idler shafts, one for each of said conveyor frame means.

6. A vehicle for transporting and unloading crop, forage and the like comprising, in combination, main frame means including supporting wheels; body means including side walls and end walls; conveyor frame means extending longitudinally of said body means within said walls, said conveyor frame means including an end portion provided with open ended slots; driven shaft means disposed in said open ended slots; means for opening and closing the open ends of said slots; driving means mounted on said vehicle and connected to said driven shaft means; idler shaft mounting means mounted on the other end portion of said conveyor frame means; idler shaft means on said idler shaft mounting means; a main endless conveyor means mounted on said shaft means and including a discharge end spaced inwardly from one of said end walls; means for opening and closing the open ends of said slots whereby said driven shaft means and endless conveyor means can be easily installed or removed with respect to said vehicle; and cross conveyor means mounted on said frame means adjacent said one end wall and below said discharge end, said body means including a discharge opening for said cross conveyor means.

7. The apparatus defined in claim 6 wherein said idler shaft mounting means includes a slot for axially shiftably mounting said idler shaft means.

8. The apparatus defined in claim 6 wherein said idler shaft mounting means includes an open ended slot for removably shiftably mounting said idler shaft means.

9. The apparatus defined in claim 6 wherein said endless conveyor means comprises two separate endless conveyors.

References Cited

UNITED STATES PATENTS

| | | | |
|---|---|---|---|
| 1,000,974 | 8/1911 | Anderson | 198—208 XR |
| 1,188,949 | 6/1916 | Koehler. | |
| 1,781,736 | 11/1930 | Shaw | 308—24 |
| 2,563,418 | 8/1951 | Peter et al. | 214—83.36 XR |
| 2,609,952 | 9/1952 | Balzer et al. | 214—83.36 |
| 2,635,736 | 4/1953 | Rust | 198—208 |
| 2,635,772 | 4/1953 | Rosheim | 214—83.36 |

ALBERT J. MAKAY, Primary Examiner

U.S. Cl. X.R.

198—208; 214—83.26; 308—24